April 14, 1959   F. W. SCHWING   2,881,932
HOEING-SHOVEL LOADER
Filed Jan. 4, 1955   5 Sheets-Sheet 1

Inventor
Friedrich Wilhelm Schwing
by Rudolph W. Praser
attorney

April 14, 1959   F. W. SCHWING   2,881,932
HOEING-SHOVEL LOADER

Filed Jan. 4, 1955                              5 Sheets-Sheet 2

Inventor
Friedrich Wilhelm Schwing
by Malcolm W. Fraser
attorney

April 14, 1959  F. W. SCHWING  2,881,932
HOEING-SHOVEL LOADER

Filed Jan. 4, 1955  5 Sheets-Sheet 3

Inventor
Friedrich Wilhelm Schwing
by Malcolm W. Fraser
attorney

April 14, 1959

F. W. SCHWING 2,881,932

HOEING-SHOVEL LOADER

Filed Jan. 4, 1955

INVENTOR
Friedrich Wilhelm Schwing
by Malcolm W. Fraser
attorney

April 14, 1959 F. W. SCHWING 2,881,932
HOEING-SHOVEL LOADER

Filed Jan. 4, 1955 5 Sheets-Sheet 5

INVENTOR.
FRIEDRICH WILHELM SCHWING

BY
ATTORNEY

United States Patent Office 2,881,932
Patented Apr. 14, 1959

2,881,932

HOEING-SHOVEL LOADER

Friedrich Wilhelm Schwing, Wanne-Eickel, Germany

Application January 4, 1955, Serial No. 479,707

Claims priority, application Germany October 30, 1954

11 Claims. (Cl. 214—147)

The present invention relates to a dredger, and loader, and it is the principal object of the invention to construct such a machine according to entirely new principles of design and operation, and far superior to the machines of this general type previously known.

More specifically, the invention relates to a machine, the purpose and function of which might best be described by calling it a "hoeing-shovel loader" which is preferably to be mounted on a motor vehicle. Most prior designs of self-propelled loaders or dredgers wherein the shovel is pivotally mounted at the front of the truck are based upon the principle of filling the shovel by the sheer force and pressure of the advancing vehicle pushing the shovel into the material to be loaded. The force required to fill the shovel by pushing it into the material to be loaded is thus dependent upon the weight of the machine and its frictional resistance relative to the ground. Wheel-propelled machines of this type, because of their small road-surface friction, are relatively uneconomical even though their truck or undercarriage may be made of great weight and be provided with special non-skid tires.

To increase their stability and road-surface friction upon which their principle of operation largely depends, loaders of this type are frequently mounted on Caterpillar tracks. Such vehicles have, however, the disadvantage of being too bulky and clumsy, as well as very expensive, and of being so slow and hard to drive on a road that usually they are loaded on a special truck to be transported to their working location.

A still more important deficiency of all loaders and dredgers of this type known, and in practical use today is that they can only work in the driving direction of their truck since the shoveling movement is produced by the truck itself. This means that the effective range of operation of such shovel is determined by its own width, and that considerable maneuvering of the truck will be required at a great waste of time and effort to increase such operating range over a wider area.

It is now an object of the present invention to design a self-propelled dredger and loader which avoids all the deficiencies inherent in similar machines previously known and as outline above.

A further object of the invention is to design a loader or dredger of this type, the operation of which is not dependent upon the movement of its truck and which can carry out its loading operation without requiring its undercarriage or truck to be shifted.

The basic principle of the invention consists in combining the movement and operation of a loading shovel with that of a hoeing or digging shovel, and the main feature of the invention for accomplishing the above-mentioned object thus consists in the combination of a loading shovel of more or less standard design with a hoeing or digging shovel which is first advanced a certain suitable distance forwardly of the front edge of the loading shovel and, with the truck in a stationary position, is then driven into the ground or other material to be loaded to loosen the same and convey it toward the loading shovel which may thus be filled either by one or repeated hoeing and conveying operations of such digging shovel.

Another object of the invention is to transmit the forces required for the hoeing or digging operation directly to the loading shovel which constitutes the supporting base of the hoeing shovel so that the force required for its operation is no longer dependent upon the weight of the vehicle and its traction on the ground. Consequently, such vehicle may be of much lighter and more mobile construction than was previously possible, neither requiring an undercarriage of special weight and strength nor any special non-skid tires or Caterpillar tracks.

A further object of the invention is to design a dredger or loader, the loading operation of which is, as such, not dependent upon the truck and its direction of movement, and which may properly carry out its function either in the driving direction of the truck or in any other direction laterally of or behind the truck, and thus permits a tremendous increase in maneuverability and hauling capacity as compared with previous loaders when used in one and the same truck position thereof. For this reason, the new loader may also be mounted on a stationary base independently of the vehicle.

For accomplishing this object another feature of the invention consists in mounting the two cooperating scoops or shovels as well as their beam structure so as to be pivotable in either direction on a suitable turntable or the like.

Another object and feature of the invention resides in the provision of suitable jarring means to facilitate the penetration of the scoops or shovels into solidly packed material, for example, the unbroken ground.

Another object of the invention consists in designing the beam structure of the two types of scoops or shovels, as well as their operating mechanism so as to permit them to be used either in cooperation with each other or independently and separately of each other.

Another feature of the invention resides in the possibility of exchanging the normal scoops or shovels of both types of dredgers for those designed for a special purpose, for example, for digging a trench or ditch.

Although the invention will be described as applied to a wheel-driven tractor or automobile, the new combination of a hoeing with a loading shovel may also be applied to Caterpillar tractors if such type of vehicle be desirable for any reasons other than their greater traction on the ground. Also, as previously indicated, the new combination may be applied to a stationary structure by mounting the turntable or similar mechanism supporting the two types of shovels upon a stationary base independently of any vehicle.

Further objects, features, and advantages of the present invention will be apparent from the following detailed description of the new hoeing-shovel loader and the accompanying drawings thereof, wherein—

Fig. 8 shows a magnetic system for controlling the entire cycle of operations automatically and in a suitable time sequence; while

Figure 1:
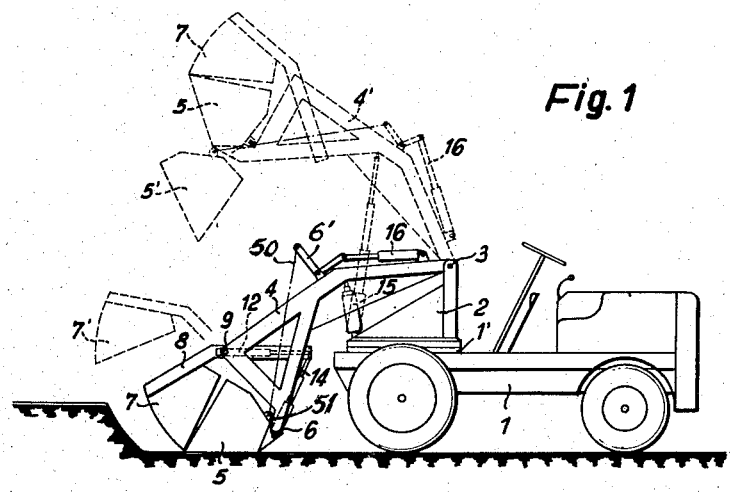
Fig. 1 shows a side view of the new machine equipped with two cooperating shovels, that is, a hoeing scoop and a loading bucket.
Figure 2:
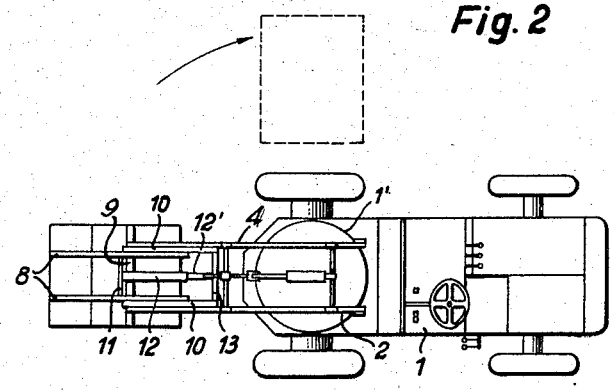
Fig. 2 shows a top view thereof.
Figure 3:
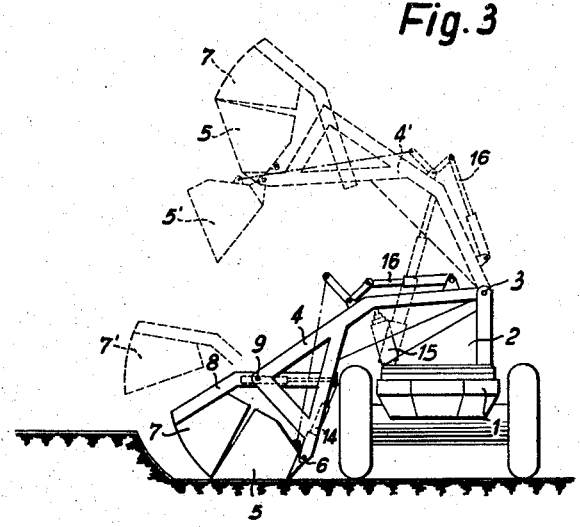
Fig. 3 shows a front view of the machine with the two shovels swung out toward one side of the truck for working laterally thereof.

Referring to the drawings, Figs. 1 to 3 show the entire machine mounted on a truck 1 which is preferably driven by wheels and carries on one end portion, preferably its front part, a turntable 1' which supports the swiveling mechanism 2 so as to be rotatable about a vertical axis. The swiveling mechanism 2 has a shaft 3 on which the angular beams 4 are supported so as to be pivotable about a horizontal axis. At their outer end, beams 4 have pivotally mounted thereon at 6 the loading bucket 5, and opposite thereto at 9 the hoeing scoop 7 and parallel levers 8 connected therewith are pivotally mounted on the beams 4.

Figure 10:
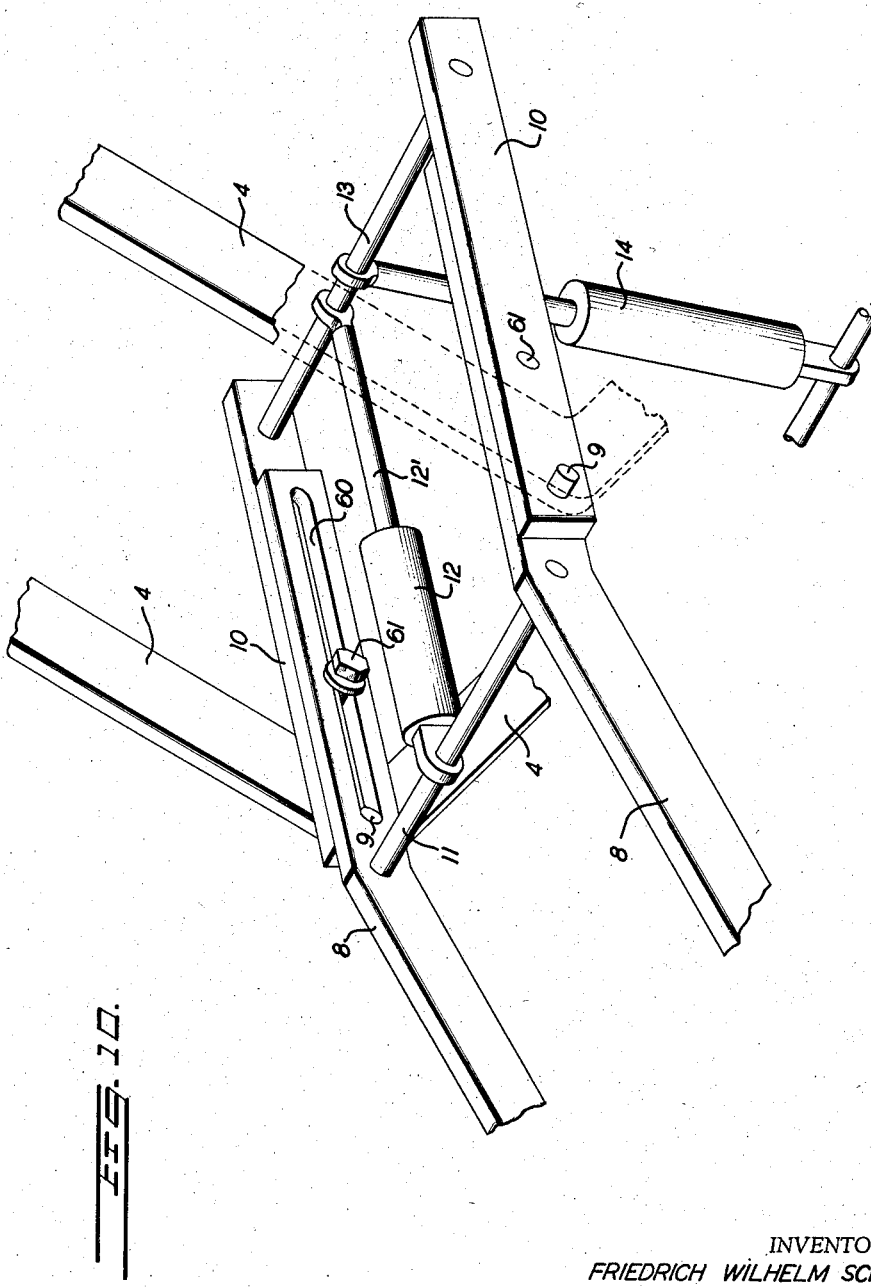
Fig. 10 is an enlarged perspective view of the assembly for mounting and operating the levers carrying the hoeing scoop.

The two parallel levers 8 as shown particularly in Fig. 2 are slotted and slidable in a longitudinal direction in suitable slides or guide bars 10 and are connected with each other by a rod 11. This rod 11 is in engagement with the driving mechanism 12 consisting, for example, of a hydraulic cylinder, the piston rod 12' of which is mounted on one crossbar 13 connecting the guide bars 10. As shown in Fig. 2, the entire assembly of hoeing scoop 7, supporting parallel levers 8, crossbar 11, guides 10, crossbar 13 and the actuating hydraulic cylinder 12 are pivoted on beams 4 at 9 for rotational movement about a horizontal axis. Another hydraulic cylinder 14 is mounted upon the beams 4 and acts upon the assembly at crossbar 13 for pivoting the same about the pivot point 9, while the cylinder 12 causes relative linear movement between the hoeing scoop 7 and levers 8 and the framework consisting of guides 10, crossbar 13, pivot 9, and beams 4. Figure 10 shows levers 8 slotted at 60 and slidably bolted to guide bars 10 at 61. The pins 9 about which the entire assembly pivots upon operation of cylinder 14 acts as a stop upon retraction of levers 8 and scoop 7 by means of cylinder 12 and piston rod 12', while bolts 61 act as a stop upon extension of the scoop and levers by the same actuating means 12 and 12'.

The hoeing scoop 7 is thus adapted to be pivoted by hydraulic cylinder 14 and moved forwardly by the advancing cylinder 12, its levers 8 then sliding along their guides 10.

The advanced position of the hoeing scoop is indicated in Fig. 1 in dotted lines by the reference numeral 7'. By a suitable control of the pivoting cylinder 14 the hoeing scoop 7' will be driven into the material to be loaded or the ground to be broken and by then moving the advancing cylinder in the opposite direction the hoeing scoop 7' will draw or scrape the loosened material backwardly toward the loading bucket 5. The successive steps of raising, advancing, and striking of the hoeing scoop 7 may be repeated as often as necessary until the loading bucket 5 is filled sufficiently. Thereafter, the entire loading shovel with the hoeing scoop thereon in a retracted position so as to close the bucket 5 is swung upwardly by an elevating mechanism engaging the beams 4 and consisting of a hydraulic cylinder 15 mounted on the turntable 1', until the loading shovel reaches the discharging position indicated at 4', whereupon the bucket 5 thereof is pivoted by the cylinder 16 into the dumping position 5 to dump the material therefrom. The cylinder 16 pivots loading bucket 5 about the pivot 6 through the right angled lever 6' pivoted on beam 4 and cable 50 extending from lever 6' and attached to bucket 5 at 51. It may be seen from Figures 1 and 3 that only the front edges of hoeing scoop 7 and loading bucket 5 are contacting when in loaded and dumping position. The clearance between the sides and rear edges of the scoop and bucket permits free pivoting of the latter about the pivot 6.

Fig. 3 illustrates the same steps of loading and unloading the two shovels as previously described, but with the hoeing shovel loader working laterally of the truck 1 rather than in the forward position as shown in Figs. 1 and 2, the same reference numerals being applied as in the previous drawings.

Figure 4:
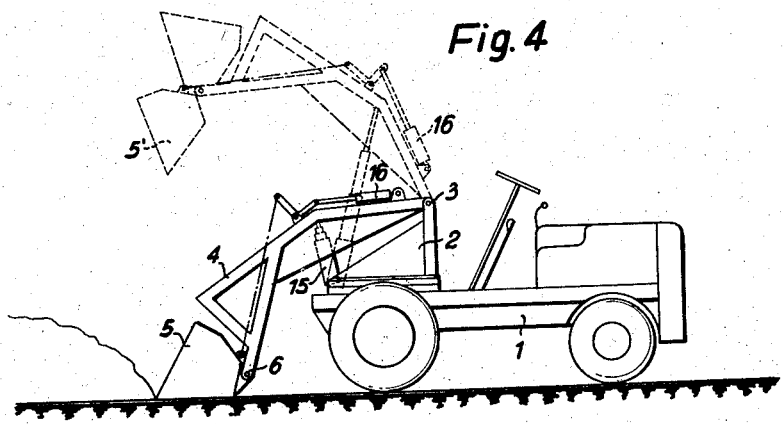
Fig. 4 shows the machine when only using the loading shovel.

Fig. 4 shows how under certain conditions the new shovel loader may also be used with the loading shovel 5 working alone after the hoeing scoop has been removed.

Figure 5:
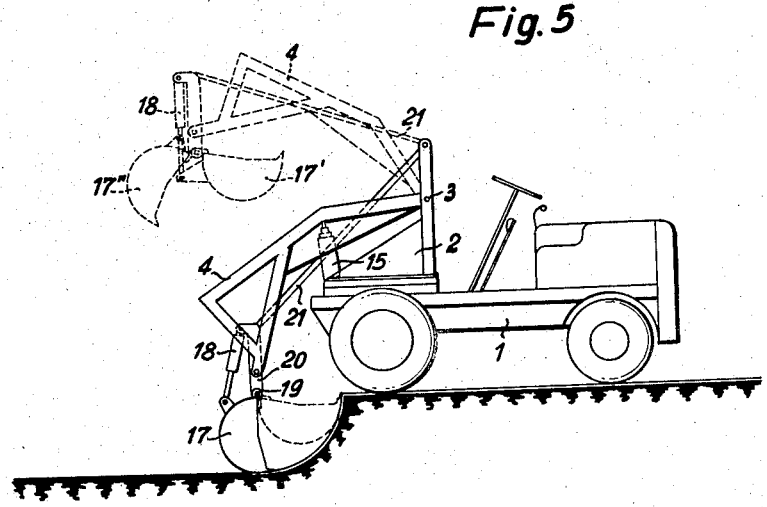
Fig. 5 shows the machine with the loading bucket replaced by a digging scoop.

If the machine is to be used primarily for digging trenches or similar excavations, the two shovels may be easily exchanged for a special digging scoop 17, as illustrated in Fig. 5. Such digging scoop is pivotably mounted at 19 on a lever 20 and actuated by a hydraulic cylinder 18. After filling the digging scoop 17 it is raised by the beams 4 to the discharging position 17' indicated in Fig. 5 in dotted lines, and then swiveled by the hydraulic cylinder 18 to the dumping position 17''. Tilting of the scoop and premature dumping of the material therefrom is prevented during the elevating and swivelling steps by the lever 21.

Figure 6:
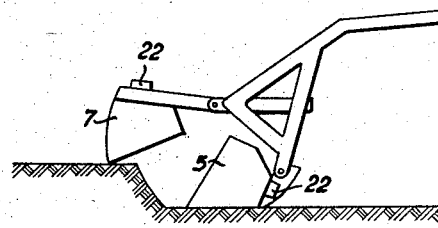
Fig. 6 is a partial view of the machine showing the auxiliary jarring mechanism for the hoeing and loading shovels.

Fig. 6 illustrates jarring appliances 22 of any suitable design, such as electrical vibrators mounted on the loading and hoeing shovels 5 and 7.

The various movements of each of the embodiments of the invention as previously described may be controlled by suitable mechanism of well-known design connected with the new hoeing shovel loader for the purpose of running it either automatically at a planned sequence of operations or by carrying out the individual working steps independently of each other.

Figure 7:
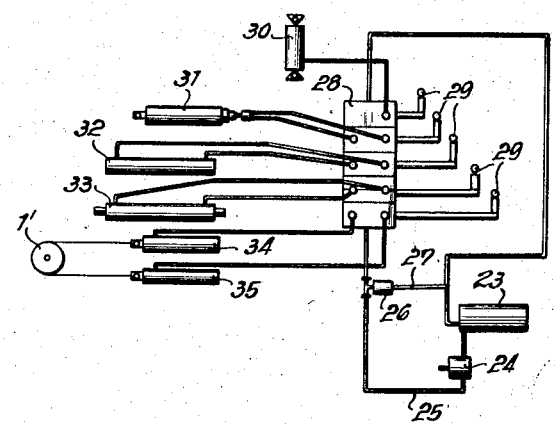
Fig. 7 is a diagrammatical illustration of a system for controlling the different operations of the machine individually.

An example of a manually operated control of the individual hydraulic cylinders is illustrated in Fig. 7 wherein a pump 24 draws in the oil from the oil tank 23 and conveys it through the pressure line 25 past the governor relief valve 26 and the overflow line 27 to the casing 28 containing the control valves, the valve stems 29 of which may be used to control the operation of the individual hydraulic cylinders 30 to 35 inclusive, the cylinders 34 and 35 of which operate the turntable 1', while cylinders 30, 31, 32 and 33, respectively control the longitudinal movement of levers 8 and hoeing scoop 7, the pivoting and resulting digging function of hoeing scoop 7, the pivoting and dumping function of bucket 5, and the raising and pivoting movement of beams 4.

Figure 8:
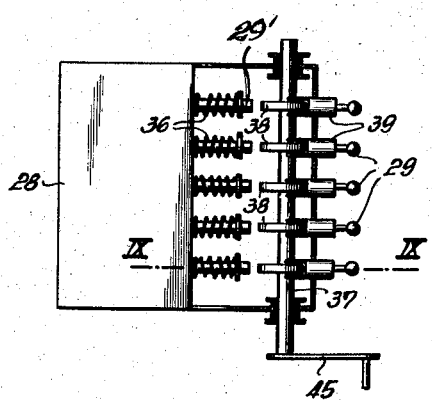
Figure 9:
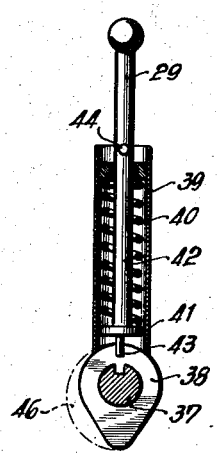
Fig. 9 is a cross section through one control element shown in Fig. 8 and taken along line 9—9 of Fig. 8.

For actuating any of the individual control valves either simultaneously or in any particular order of succession, the invention provides an automatic control mechanism as illustrated in Fig. 8 in which the valve stems 29' projecting from the valve casing 28 are always acted upon by springs 36 tending to return the same to their inactive position. Valve stems 29' are engaged by the cams or eccentrics 38 which counteract the action of springs 36 and depress the valve stems 29' to actuate the hydraulic cylinders through the control valves in casing 28. The cams are mounted unkeyed on a control shaft 37 cooperating with a spring 40 provided in a spring housing 39, as shown in Fig. 9. Spring 40 acts upon a flange 41 on the rod 42, the end 43 of which is adapted to enter into a bore of the shaft 37 when the stem 42 is turned so that the crosspin 44 thereof is able to engage into a transverse slot of the spring housing 39, thereby coupling the rod 42 and the cam 38 with the shaft 37. When in the retracted position, the pin 43 on the stem 42 is disengaged from the shaft 37. Thus, each of the cams 38 can be adjusted independently of the others for individual actuation of the valve stems 42, while any one of the valve stems 42 may be engaged with the respective cam 38 on the control shaft 37 to couple several valves for simultaneous operation. For facilitating such adjustment of the shaft 37, the same may also be provided with a suitable lever or crank 45. Also, for effecting a gradual transfer from one control position to the other the cam surface 46 of any or all of the cams 38 may be extended as shown in Fig. 9.

While I have described my invention with reference to the preferred embodiments thereof I wish to have it understood that it is in no way limited to the details of such embodiments or to the specific examples described, but is capable of numerous modifications within the scope of the appended claims.

What I claim is:

1. A hoeing shovel loader comprising a base, a beam structure on said base, a loading shovel pivotally mounted on said beam structure, a hoeing shovel mounted on an extended member pivoted to said beam structure and slidable relative thereto, means for advancing and retracting said hoeing shovel relative to said loading shovel, means for pivoting said hoeing shovel for raising and lowering the same relative to said loading shovel, said extended member being pivoted intermediate the hoeing shovel and the means for pivoting said member and said hoeing shovel, means for pivoting said beam structure about at least one axis relative to said base, and means for pivoting said loading shovel about a substantially horizontal axis relative to said beam structure.

2. A hoeing shovel loader comprising a base, a beam structure mounted on said base, means for pivoting said beam structure about a substantially vertical axis relative to said base, a hoeing shovel and a loading shovel on said supporting structure, means for pivoting said hoeing shovel about a substantially horizontal axis relative to and forwardly of the open mouth of said loading shovel so as to raise and lower said hoeing shovel and means to retract said hoeing shovel toward said loading shovel so as to exert a hoeing action upon the material to be loosened thereby and to fill the same into said loading shovel, means for pivoting said beam structure about a substantially horizontal axis relative to said base so as to raise and lower said structure together with said shovels, and means for pivoting said loading shovel about a substantially horizontal axis relative to said supporting structure to dump said material therefrom.

3. A hoeing shovel loader comprising a base, means for rotating said base about a substantially vertical axis, a beam structure on said base, means for pivoting said beam structure about a horizontal axis relative to said base, a hoeing shovel and a loading shovel pivotally mounted on said supporting structure, means for advancing and retracting said hoeing shovel relative to said loading shovel, means for pivoting said hoeing shovel about a substantially horizontal axis relative to and forwardly of said loading shovel, whereby said hoeing shovel is first advanced forwardly of the open mouth of said loading shovel resting on the ground and is then pivoted upwardly and downwardly to exert a hoeing action upon the material to be loosened thereby and is then retracted toward said loading shovel to fill the same, whereupon said beam structure is pivoted upwardly to raise both of said shovels, and means for pivoting said loading shovel about a substantially horizontal axis relative to said supporting structure to dump the material therefrom.

4. A hoeing shovel loader as defined in claim 3, further comprising means for controlling the individual operating means of said shovels so as to operate automatically in a predetermined order of succession.

5. A hoeing shovel loader as defined in claim 3, further comprising means for controlling the individual operating means of said shovels in a predetermined order of succession, and including coupling means for coupling at least two of said operating means so as to work simultaneously.

6. A hoeing shovel loader comprising a loading shovel pivotally mounted on a supporting means, said loading shovel being in fixed relation to said supporting means during loading, a hoeing shovel mounted on an extended member pivoted intermediate its ends to said supporting means, said hoeing shovel and extended member being slidable relative to said supporting means and means for raising and extending said hoeing shovel with respect to said supporting means and loading shovel and for then lowering said hoeing shovel to loosen the material to be loaded and retracting said hoeing shovel into loading engagement with said loading shovel held in fixed position.

7. A hoeing shovel loader according to claim 6 having means for pivoting said loading shovel only when said supporting means is in unloading position.

8. A hoeing shovel loader according to claim 6 having independent means provided for slidably extending and retracting said hoeing shovel, and for pivotally raising and lowering said hoeing shovel.

9. A hoeing shovel loader according to claim 6 having a base upon which said supporting means for the loading and hoeing shovels is pivotally mounted, and means for pivoting said supporting means about a horizontal axis to raise the shovels to unloading position.

10. A hoeing shovel loader as defined in claim 6, wherein said loading and hoeing shovels and the means for operating said shovels are mounted on a motor vehicle.

11. A hoeing shovel loader as defined in claim 6, further comprising jarring means connected to at least one of said shovels for jarring and shaking said shovel.

References Cited in the file of this patent

UNITED STATES PATENTS

| | | |
|---|---|---|
| 606,720 | Hulett | July 5, 1898 |
| 1,365,541 | Rankin | Jan. 11, 1921 |
| 2,705,082 | Heimsoth | Mar. 29, 1955 |

FOREIGN PATENTS

| | | |
|---|---|---|
| 177,541 | Austria | Feb. 10, 1954 |
| 719,034 | Great Britain | Nov. 24, 1954 |